(12) United States Patent
Zhang et al.

(10) Patent No.: US 10,088,724 B2
(45) Date of Patent: Oct. 2, 2018

(54) DISPLAY PANEL AND DISPLAYING DEVICE

(71) Applicants: Shanghai Tianma Micro-Electronics Co., Ltd., Shanghai (CN); Tianma Micro-Electronics Co., Ltd., Shenzhen (CN)

(72) Inventors: Minfu Zhang, Shanghai (CN); Dong Qian, Shanghai (CN); Yuan Li, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 262 days.

(21) Appl. No.: 14/980,538

(22) Filed: Dec. 28, 2015

(65) Prior Publication Data
US 2016/0187752 A1    Jun. 30, 2016

(30) Foreign Application Priority Data
Dec. 29, 2014    (CN) .......................... 2014 1 0856761

(51) Int. Cl.
G02F 1/136 (2006.01)
G02F 1/1362 (2006.01)
(Continued)

(52) U.S. Cl.
CPC .... G02F 1/136286 (2013.01); G02F 1/13306 (2013.01); G02F 1/13452 (2013.01);
(Continued)

(58) Field of Classification Search
None
See application file for complete search history.

(56) References Cited

U.S. PATENT DOCUMENTS 7,692,609 B2    4/2010    Ouchi et al.
9,660,192 B2    5/2017    Ren
(Continued)

FOREIGN PATENT DOCUMENTS

CN    201886234 U    6/2011
CN    202306077 U    7/2012
(Continued)

OTHER PUBLICATIONS

Chinese Application No. 201410856761.7, Second Office Action dated Sep. 13, 2017.
(Continued)

Primary Examiner — Richard Kim
(74) Attorney, Agent, or Firm — Alston & Bird LLP

(57) ABSTRACT

Display panel and displaying device are provided. Except for a first data line electrode layer on a first substrate, a display panel further includes a first insulating layer on the first data line electrode layer and a second data line electrode layer on the first insulating layer. The first data line electrode layer includes a plurality of first data lines, and the second data line electrode layer includes a plurality of second data lines respectively corresponding to the first data lines. A plurality of vias are disposed in the first insulating layer and expose a portion of the first data lines. The second data lines are electrically connected with the first data lines through the vias, which may decrease resistance of each data line, reduce the attenuation of a driving signal transmitted in the data lines far away from a driving circuit, and improve displaying effect of the display panel.

19 Claims, 8 Drawing Sheets

(51) Int. Cl.
*G02F 1/1343* (2006.01)
*G02F 1/1333* (2006.01)
*G02F 1/1345* (2006.01)
*G02F 1/133* (2006.01)
*G02F 1/1335* (2006.01)
*H05B 33/26* (2006.01)

(52) U.S. Cl.
CPC .. *G02F 1/133345* (2013.01); *G02F 1/133514* (2013.01); *G02F 1/134309* (2013.01); *H05B 33/26* (2013.01)

(56) References Cited

U.S. PATENT DOCUMENTS

| | | | |
|---|---|---|---|
| 2005/0140841 A1* | 6/2005 | Yang | G02F 1/1368 349/43 |
| 2010/0079717 A1 | 4/2010 | Park et al. | |
| 2012/0105784 A1 | 5/2012 | Ho et al. | |
| 2013/0292768 A1 | 11/2013 | Cho et al. | |
| 2014/0159037 A1* | 6/2014 | Kwon | H01L 29/78618 257/43 |
| 2015/0185572 A1 | 7/2015 | Han et al. | |

FOREIGN PATENT DOCUMENTS

| | | |
|---|---|---|
| CN | 103383924 A | 11/2013 |
| CN | 103681773 A | 3/2014 |
| CN | 103715205 A | 4/2014 |
| CN | 103728802 A | 4/2014 |
| TW | 201217876 A | 5/2012 |

OTHER PUBLICATIONS

Chinese Application No. 201410856761.7, First Office Action dated Jan. 19, 2017.

* cited by examiner

DISPLAY PANEL AND DISPLAYING DEVICE

CROSS-REFERENCE TO RELATED APPLICATIONS

The present application claims priority to Chinese patent application No. 201410856761.7, filed with the Chinese Patent Office on Dec. 29, 2014, and entitled "DISPLAY PANEL AND DISPLAYING DEVICE", and the entire disclosure of which is incorporated herein by reference.

FIELD OF THE DISCLOSURE

The present disclosure generally relates to display technology, and particularly, to a display panel and a displaying device comprising the display panel.

BACKGROUND OF THE DISCLOSURE

As shown in FIG. 1, a conventional display panel includes a plurality of display units 01 arranged in matrix in a display region of the display panel, and two driving circuits 02 in a non-display region of the display panel. The driving circuits 02 are configured to provide a driving signal used for controlling the displaying of each display unit 01 through scanning lines 03 and data lines 04 which are electrically connected with the display units 01. Each scanning line 03 is electrically connected with one row of the display units 01, and each data line 04 is electrically connected with one column of the display units 01.

With development of display technologies, display panels are increasing in size. There are more display units required to be disposed in one column, which increases the load in each data line. Generally, along a data line, the driving signal will degrade with the increase of transmission distance. In the display panel, the display units relatively far away from a driving unit may receive seriously decayed driving signals, which may lead to negative displaying effects.

SUMMARY

In an embodiment of the present disclosure, a display panel is provided, including a display region and a non-display region disposed around the display region.

The display panel may further include: a first substrate; a plurality of gate lines disposed on the first substrate; a first data line electrode layer disposed on the first substrate, wherein the first data line electrode layer includes a plurality of first data lines which intersect with and are insulated from the plurality of gate lines; a first insulating layer disposed on the first data line electrode layer, wherein a plurality of first vias are formed in the first insulating layer and expose a portion of the first data lines; and a second data line electrode layer disposed on the first insulating layer, wherein the second data line electrode layer includes a plurality of second data lines which respectively correspond to the plurality of first data lines and are electrically connected with the plurality of first data lines through the plurality of first vias.

In an embodiment of the present disclosure, a displaying device including the above display panel is provided.

Compared with existing techniques, embodiments of the present disclosure may have following advantages. In the embodiments of the present disclosure, except for the first data line electrode layer disposed on the first substrate, the display panel further includes the first insulating layer disposed on the first data line electrode layer and the second data line electrode layer disposed on the first insulating layer. The first data line electrode layer includes the plurality of first data lines, and the second data line electrode layer includes the plurality of second data lines respectively corresponding to the first data lines. The plurality of vias are formed in the first insulating layer and expose a portion of the first data lines. Therefore, the second data lines are electrically connected with the first data lines through the plurality of vias, which may decrease the resistance of each data line in the display panel, reduce the attenuation of a driving signal transmitted in the data lines which are relatively far away from a driving circuit, and improve a displaying effect of the display panel.

BRIEF DESCRIPTION OF THE DRAWINGS

In order to clarify the objects, characteristics and advantages of the disclosure, embodiments of present disclosure will be described in detail in conjunction with accompanying drawings of the disclosure. The drawings are just examples and do not limit the scope of the disclosure, and other drawings may be obtained by a person skilled in the art based on these drawings without creative work.

DETAILED DESCRIPTION OF THE DISCLOSURE

In order to clarify the objects, characteristics and advantages of the disclosure, embodiments of present disclosure will be described in detail in conjunction with accompanying drawings.

Detailed information is given in embodiments below to make the present disclosure better understood. It should be noted that the present disclosure can be implemented by other ways different from the embodiments below. Those skilled in the art can modify and vary the embodiments without departing from the spirit and scope of the present disclosure.

Figure 1:
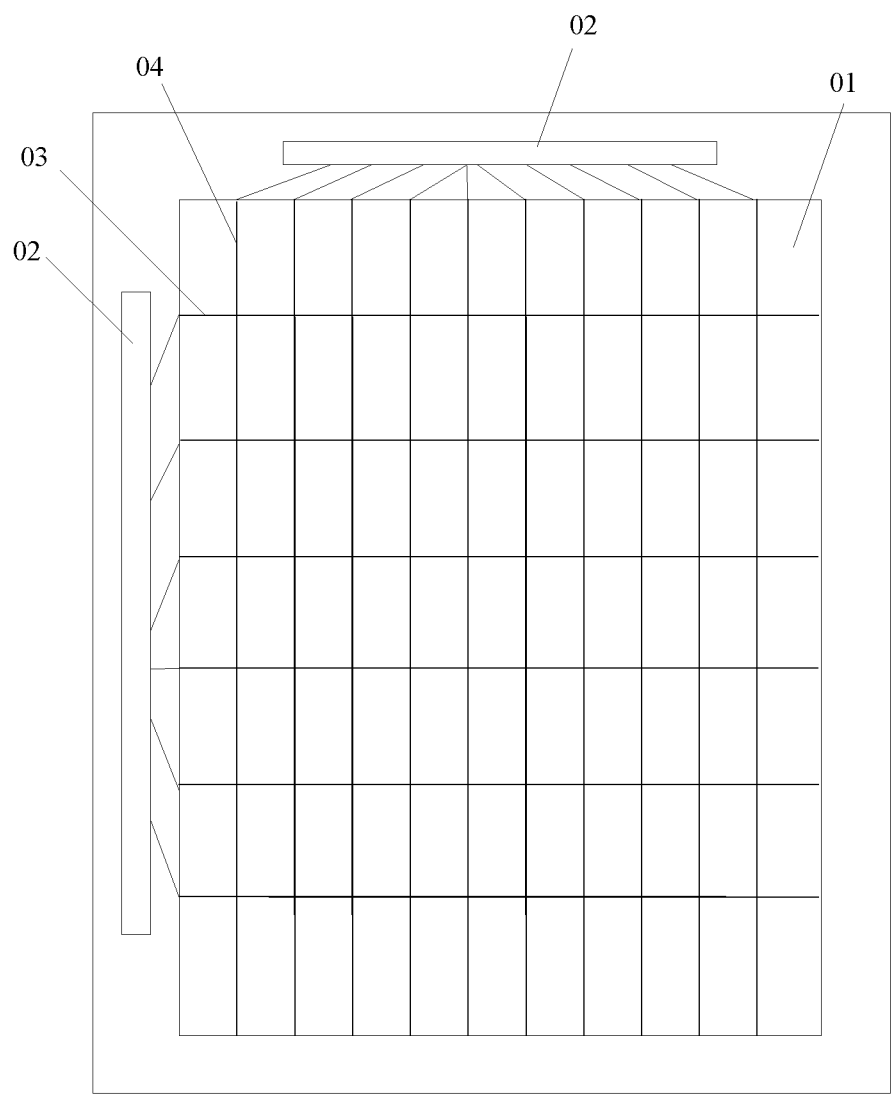
FIG. 1 schematically illustrates a vertical view of a display panel in related techniques.
Figure 2:
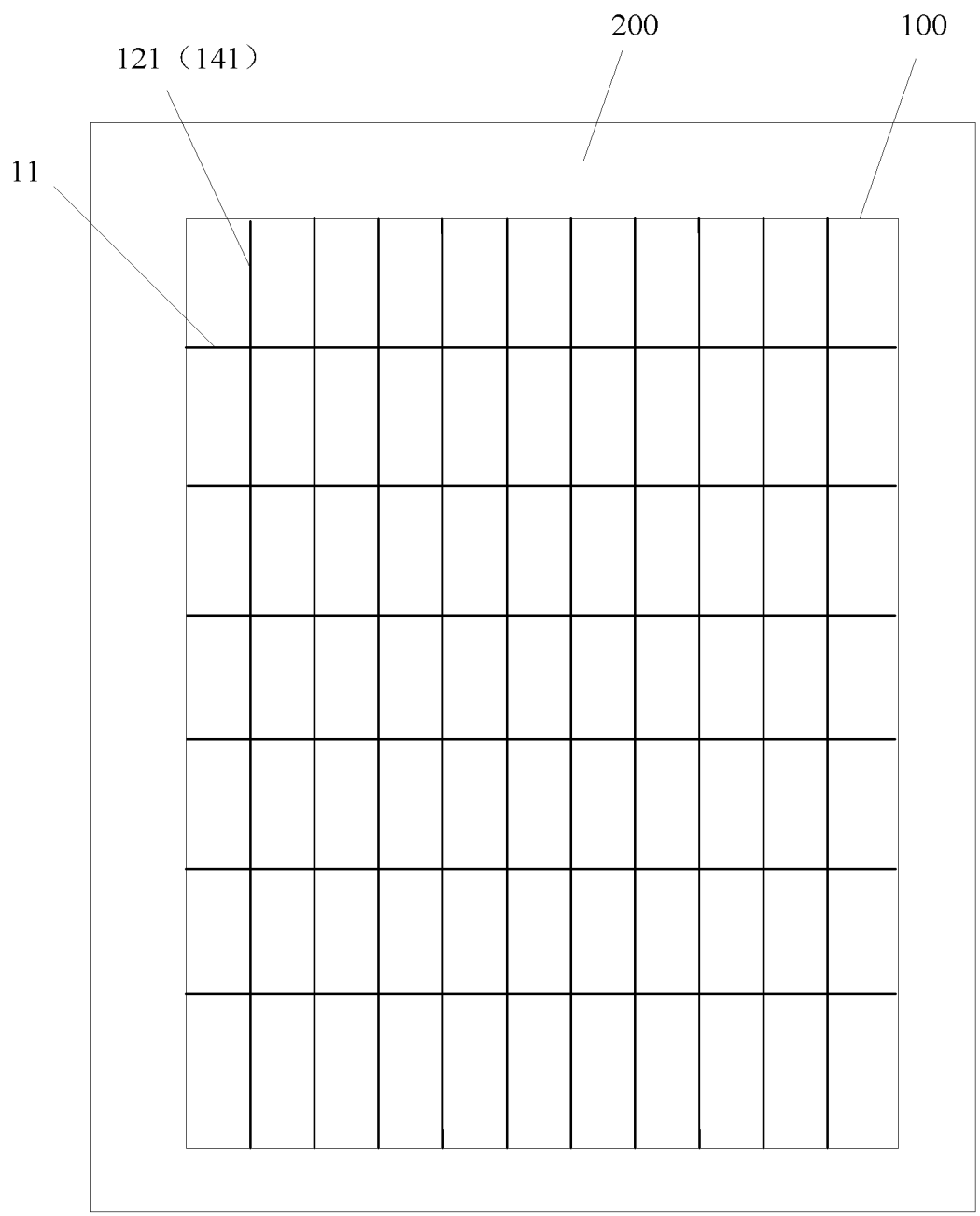
FIG. 2 schematically illustrates a vertical view of a display panel according to an embodiment of the present disclosure.
Figure 3:
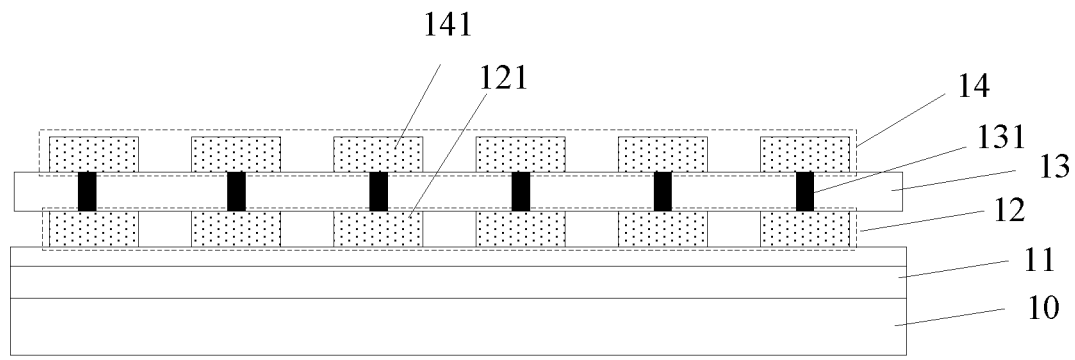
FIG. 3 schematically illustrates a sectional view of the display panel in FIG. 2.

Referring to FIG. 2, a display panel is provided, including a display region 100 and a non-display region 200 disposed around the display region 100. Referring to FIG. 3, the display panel includes: a first substrate 10, a plurality of gate lines 11 disposed on the first substrate 10; a first data line electrode layer 12 disposed on the first substrate 10, wherein the first data line electrode layer 12 includes a plurality of first data lines 121 which intersect with and are insulated from the plurality of gate lines 11; a first insulating layer 13 disposed on the first data line electrode layer 12, wherein a plurality of first vias 131 are formed in the first insulating layer 13 and expose a portion of the first data lines 121; and a second data line electrode layer 14 disposed on the first insulating layer 13, wherein the second data line electrode layer 14 includes a plurality of second data lines 141 which respectively correspond to the plurality of first data lines 121 and are electrically connected with the plurality of first data lines 121 through the plurality of first vias 131. In the display panel, the resistance of each data line may be decreased, the attenuation of a driving signal transmitted in the data lines that are located relatively far away from a driving circuit may be reduced, and a displaying effect of the display panel may be improved.

In some embodiments, each of the plurality of second data lines 141 may be disposed above one corresponding first data line 121 as shown in FIG. 3. In some embodiments, the second data lines 141 may not be disposed above the corresponding first data lines 121. Whether the second data lines 141 are disposed above the first data lines 121 is not limited in embodiments of the present disclosure, but the second data lines 141 should be electrically connected with the first data lines 121.

In some embodiments, each of the plurality of second data lines 141 is disposed above one corresponding first data line 121. If a line width of the second data lines 141 is equal to or greater than that of the first data lines 121, the second data lines 141 may be prone to break. In some embodiments, the line width of the second data lines 141 may be less than that of the first data lines 121, which may reduce the possibility of a break in the second data lines 141.

In some embodiments, a portion of the second data lines 141 are disposed on a surface of the first insulating layer 13, and a portion of the second data lines 141 are disposed in the first vias 131, such that the second data lines 141 are directly electrically connected with the first data lines 121. In some embodiments, a conductive material is filled in the first vias 131, such that the first vias 131 are filled with the conductive material, which may ensure an electrical connection between the first and second data lines. In some embodiments, the second data lines 141 may be disposed on the surface of the first insulating layer 13, and the first vias 131 are filled with a conductive material, in this way, the second data lines 141 are electrically connected with the first data lines 121 through the conductive material filled in the first vias 131. The way for realizing the electrical connection between the first and second data lines is not limited in embodiments of the present disclosure, as long as the second data lines 141 are electrically connected with the first data lines 121.

Figure 4:
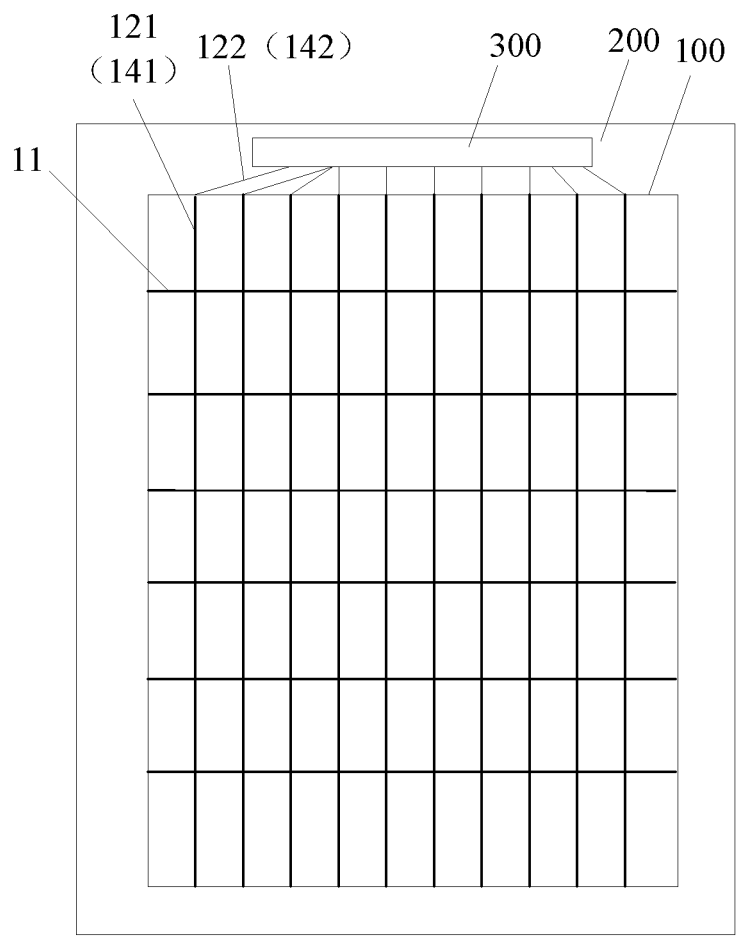
FIG. 4 schematically illustrates a vertical view of a display panel according to an embodiment of the present disclosure.
Figure 5:
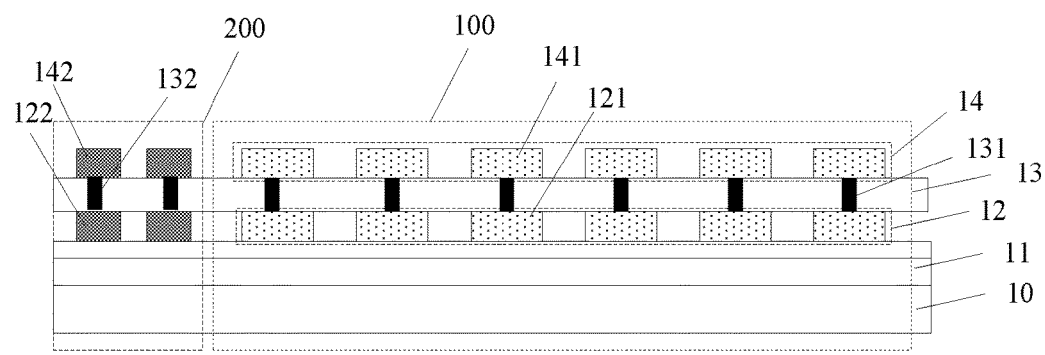
FIG. 5 schematically illustrates a sectional view of the display panel in FIG. 4.

Referring to FIGS. 4 and 5, in some embodiments, the display panel further includes: a data line driving circuit 300 disposed in the non-display region 200; a plurality of first connection lines 122 which connect the data line driving circuit 300 with the first data lines 121; a plurality of second vias 132 disposed in the first insulating layer 13, wherein the plurality of second vias 132 expose a portion of the first connection lines 122; and a plurality of second connection lines 142 which are disposed in the same layer with the second data lines 141 and electrically connected with the plurality of first connection lines 122 through the plurality of second vias 132. In the display panel, the resistance of each of the connection lines which connect the data line driving circuit 300 with the data lines may be decreased, the attenuation of a driving signal transmitted in the data lines that are located relatively far away from a driving circuit 300 may be reduced, and a displaying effect of the display panel may be improved.

In some embodiments, along a direction from the first data line electrode layer 12 to the second data line electrode layer 14, each of the plurality of second connection lines 142 may be disposed above one corresponding first connection line 122 as shown in FIG. 5. In some embodiments, a line width of the second connection lines 142 may be less than that of the first connection lines 122. The line width of the first or second connection lines may be determined upon practical situations, and is not limited in embodiments of the present disclosure.

In some embodiments, a portion of the second connection lines 142 are disposed on a surface of the first insulating layer 13, and a portion of the second connection lines 142 are disposed in the second vias 132, such that the second connection lines 142 are directly electrically connected with the first connection lines 122. In some embodiments, a conductive material is filled in the second vias 132, such that the second vias 132 are filled with the conductive material, which may ensure an electrical connection between the first and second connection lines. In some embodiments, the second connection lines 142 may be disposed on the surface of the first insulating layer 13, and the second vias 132 are filled with a conductive material, in this way, the second connection lines 142 are electrically connected with the first connection lines 122 through the conductive material filled in the second vias 132. The way for realizing the electrical connection between the first and second connection lines is not limited in embodiments of the present disclosure, as long as the second connection lines 142 are electrically connected with the first connection lines 122 to reduce the resistance of each of the connection lines which connect the data line driving circuit 300 with the data lines.

Figure 6:
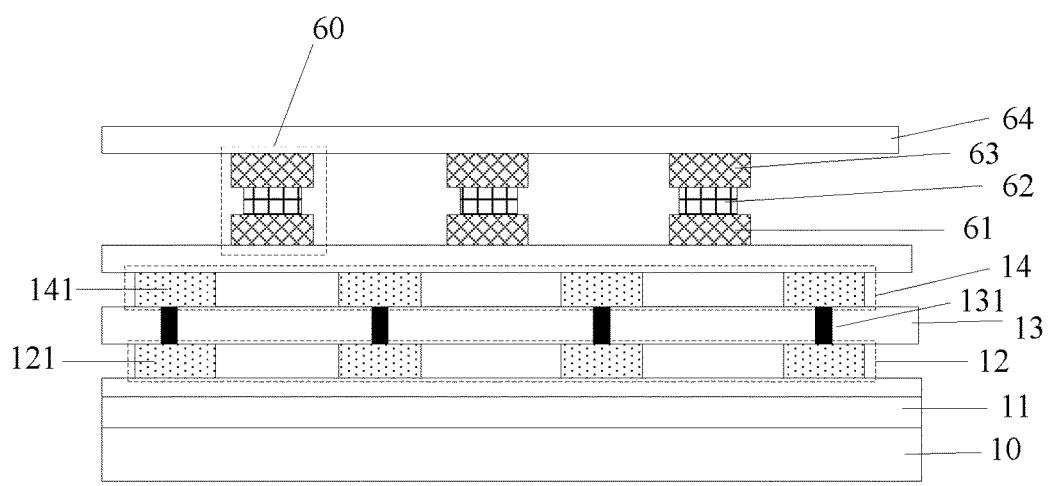
FIG. 6 schematically illustrates a sectional view of a display panel according to an embodiment of the present disclosure.

Referring to FIG. 6, in some embodiments, the display panel further includes: a plurality of display units 60 surrounded by the plurality of gate lines 11 and the plurality of first data lines 121; and a second substrate 64 disposed opposite to the first substrate 10, wherein each of the plurality of display units 60 includes a positive metal layer 61, a luminous element 62, and a negative metal layer 63 opposite to the positive metal layer 61, wherein the luminous element 62 is disposed between the positive metal layer 61 and the negative metal layer 63.

Figure 7:
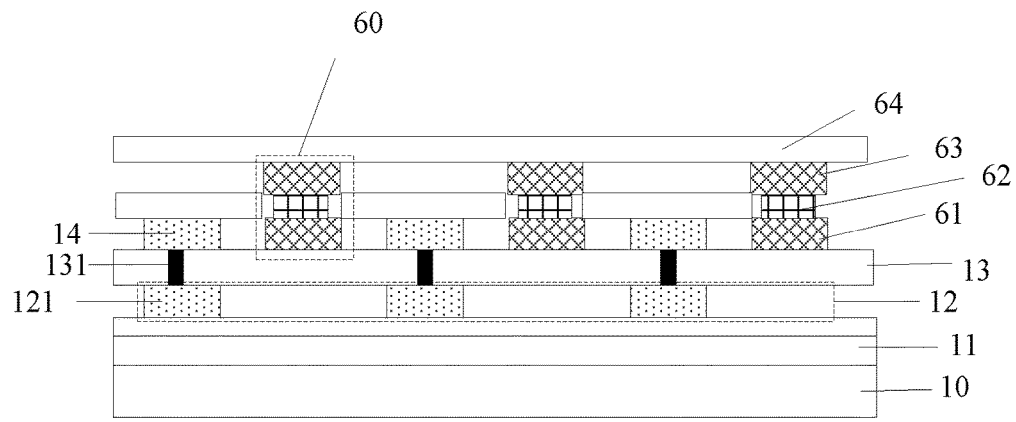
FIG. 7 schematically illustrates a sectional view of a display panel according to an embodiment of the present disclosure.

Referring to FIG. 7, in some embodiments, the second data line electrode layer 14 and the positive metal layer 61 may be disposed in the same layer, which may reduce a thickness of the display panel to accommodate a thin-and-light trend of display panels.

Figure 8:
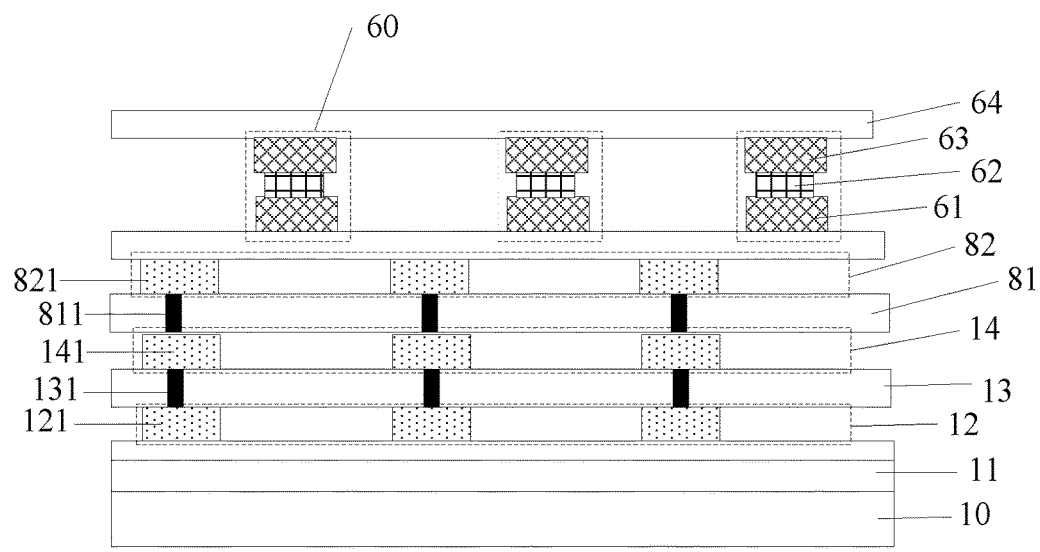
FIG. 8 schematically illustrates a sectional view of a display panel according to an embodiment of the present disclosure.

Referring to FIG. 8, the display panel may further include: a second insulating layer 81 disposed between the second data line electrode layer 14 and the positive metal layer 61; a plurality of third vias 811 disposed in the second insulating layer 81, which expose a portion of the second data lines 141; and a third data line electrode layer 82 disposed on a surface opposite to the positive metal layer 61 of the second insulating layer 81, wherein the third data line electrode layer 82 includes a plurality of third data lines 821 corresponding to the first data lines 121 and the second data lines 141. The plurality of third data lines 821 are electrically connected with the second data lines 141 through the plurality of third vias 811. The plurality of third data lines 821 are further electrically connected with the first data lines 121 through the plurality of first vias 131, which may further reduce the resistance of the data lines in the display panel.

Figure 9:
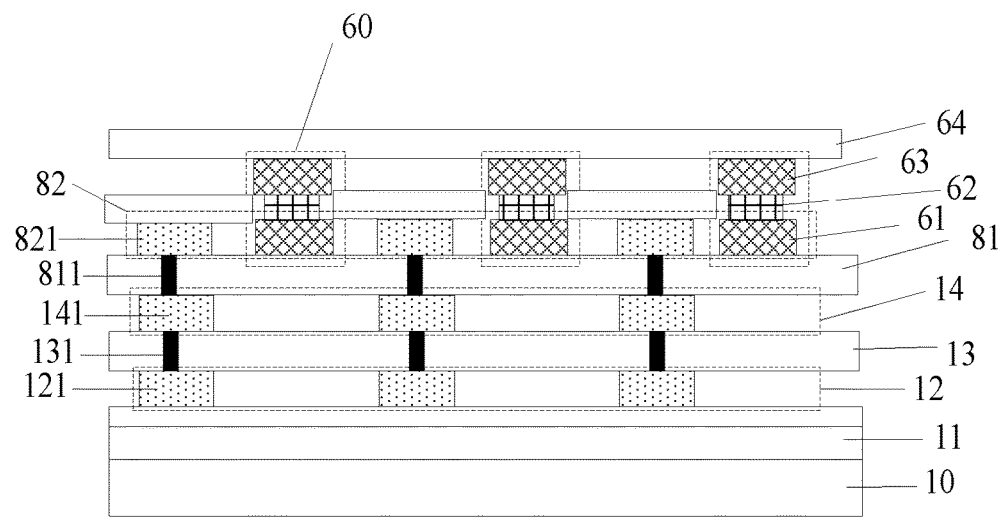
FIG. 9 schematically illustrates a sectional view of a display panel according to an embodiment of the present disclosure.

Referring to FIG. 9, in some embodiments, the third data line electrode layer 82 and the positive metal layer 61 are disposed in the same layer, which may reduce the thickness of the display panel to help create a thin-and-light display panel. In some embodiments, the second data line electrode layer 14, the third data line electrode layer 82 and the positive metal layer 61 may be disposed in different layers, which depends on practical situations and is not limited in embodiments of the present disclosure.

In some embodiments, along a direction from the second data line electrode layer 14 to the third data line electrode layer 82, each of the plurality of third data lines 821 may be disposed above one corresponding second data line 141 respectively. Whether the third data lines 821 are disposed above the second data lines 141 may be determined upon practical situations, and is not limited in embodiments of the present disclosure.

In some embodiments, each of the plurality of third data lines 821 is disposed above one corresponding second data line 141. If a line width of the third data lines 821 is equal to or greater than that of the second data lines 141, the third data lines 821 may be prone to break. As a result, in some embodiments, the line width of the third data lines 821 may be less than that of the second data lines 141, which may reduce the possibility of break of the third data lines 821.

In some embodiments, a portion of the third data lines 821 are disposed on a surface of the second insulating layer 81, and a portion of the third data lines 821 are disposed in the third vias 811, such that the third data lines 821 are electrically connected with the second data lines 141 directly. In some embodiments, a conductive material is filled in the third vias 811, such that the third vias 811 are filled with the conductive material, which may ensure a good electrical connection between the second and third data lines. In some embodiments, the third data lines 821 may be disposed on the surface of the second insulating layer 81, and the third vias 811 are filled with a conductive material, in this way, the third data lines 821 are electrically connected with the second data lines 141 through the conductive material filled in the third vias 811. The way for realizing the electrical connection between the second and third data lines is not limited in embodiments of the present disclosure, as long as the third data lines 821 are electrically connected with the second data lines 141 to reduce the resistance of each of the data lines.

In some embodiments, the display panel may further include: a plurality of fourth vias disposed in the second insulating layer, wherein the plurality of fourth vias expose a portion of the second connection lines; and a plurality of third connection lines which are disposed in the same layer with the third data lines and electrically connected with the plurality of second connection lines through the plurality of fourth vias. In the display panel, the resistance of each of the connection lines which connects the data line driving circuit with the data lines may be decreased.

In some embodiments, each of the plurality of third connection lines may be disposed above one corresponding second connection line respectively. In some embodiments, a line width of the third connection lines may be less than that of the second connection lines. Whether the third connection lines are disposed above the second connection lines, or the line width of the second or third connection lines may be determined upon practical situations, and is not limited in embodiments of the present disclosure.

In some embodiments, a portion of the third connection lines are disposed on a surface of the second insulating layer, and a portion of the third connection lines are disposed in the fourth vias, such that the third connection lines are electrically connected with the second connection lines directly. In some embodiments, a conductive material is filled in the fourth vias, such that the fourth vias are filled with the conductive material, which may ensure a good electrical connection between the second and third connection lines. In some embodiments, the third connection lines may be disposed on the surface of the second insulating layer, and the fourth vias are filled with a conductive material, in this way, the third connection lines are electrically connected with the second connection lines through the conductive material filled in the fourth vias. The way for realizing the electrical connection between the second and third connection lines may be determined upon practical situations, and is not limited in embodiments of the present disclosure.

Figure 10:
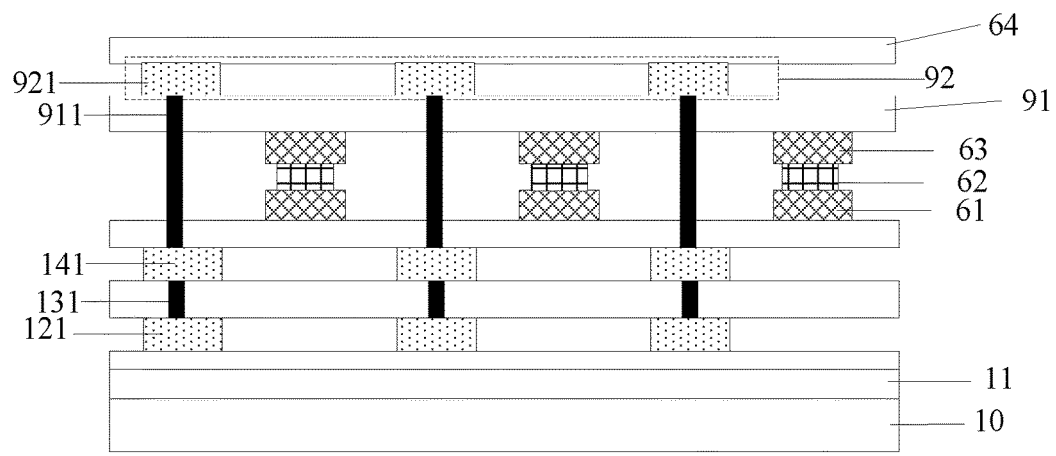
FIG. 10 schematically illustrates a sectional view of a display panel according to an embodiment of the present disclosure.

Referring to FIG. 10, in some embodiments, the display panel further includes: a third insulating layer 91 disposed between the negative metal layer 63 and the second substrate 64; a plurality of fifth vias 911 disposed in the third insulating layer 91, which expose a portion of the second data lines 141; and a fourth data line electrode layer 92 disposed on a surface opposite to the second substrate 64 of the third insulating layer 91, wherein the fourth data line electrode layer 92 includes a plurality of fourth data lines 921 corresponding to the first data lines 121 and the second data lines 141. The plurality of fourth data lines 921 are electrically connected with the second data lines 141 through the plurality of fifth vias 911 and further electrically connected with the first data lines 121 through the first vias 131, which may further reduce the resistance of the data lines in the display panel.

Figure 11:
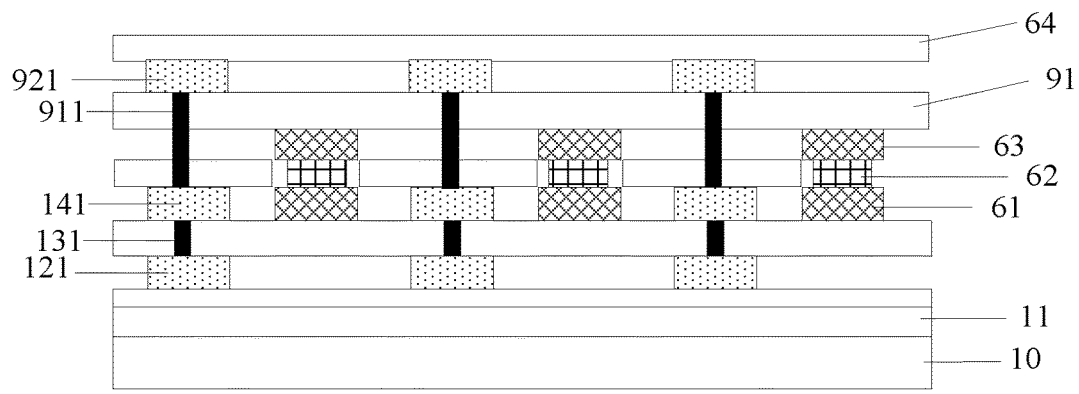
FIG. 11 schematically illustrates a sectional view of a display panel according to an embodiment of the present disclosure.
Figure 12:
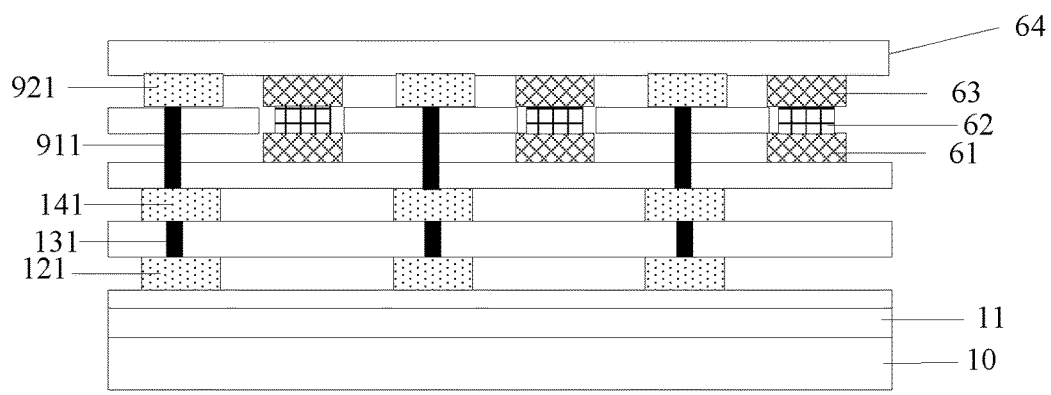
FIG. 12 schematically illustrates a sectional view of a display panel according to an embodiment of the present disclosure.
Figure 13:
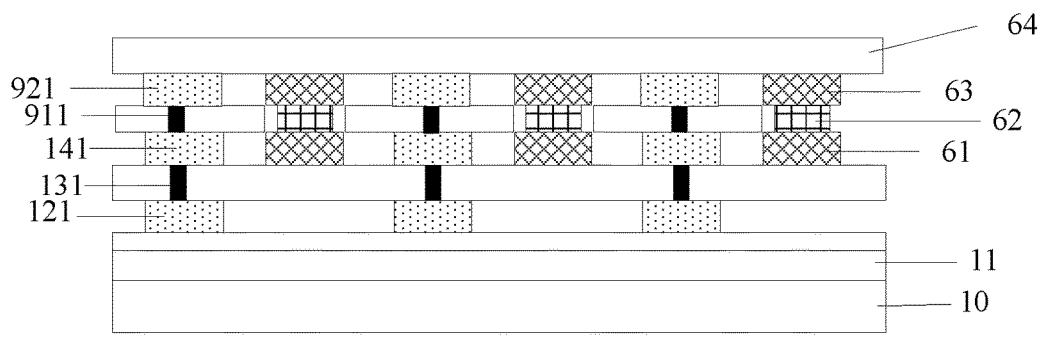
FIG. 13 schematically illustrates a sectional view of a display panel according to an embodiment of the present disclosure.

Referring to FIG. 11, in some embodiments, the second data line electrode layer 14 and the positive metal layer 61 are disposed in the same layer, which may reduce the thickness of the display panel to accommodate a thin-and-light design of a display panel. Referring to FIG. 12, in some embodiments, the fourth data line electrode layer 92 and the negative metal layer 63 are disposed in the same layer, which may reduce the thickness of the display panel to accommodate the thin-and-light trend of display panels. Referring to FIG. 13, in some embodiments, the second data lines 141 and the positive metal layer 61 are disposed in the same layer, and the fourth data line electrode layer 92 and the negative metal layer 63 are disposed in the same layer, which may further reduce the thickness of the display panel to accommodate the thin-and-light trend of display panels. Whether the second data line electrode layer 14 and the positive metal layer 61 are disposed in the same layer, or whether the fourth data line electrode layer 92 and the negative metal layer 63 are disposed in the same layer may be determined upon practical situations, and is not limited in embodiments of the present disclosure.

In some embodiments, along a direction from the second data line electrode layer to the fourth data line electrode layer, each of the plurality of fourth data lines may be disposed above one corresponding second data line respectively. Whether the fourth data lines are disposed above the second data lines is not limited in embodiments of the present disclosure, as long as the fourth data lines are electrically connected with the second data lines to reduce the resistance of the data lines.

In some embodiments, each of the plurality of fourth data lines is disposed above one corresponding second data line. If a line width of the fourth data lines is equal to or greater than that of the second data lines, the fourth data lines may be prone to break. As a result, in some embodiments, the line width of the fourth data lines may be less than that of the second data lines, which may reduce the possibility of break of the fourth data lines.

In some embodiments, a portion of the fourth data lines are disposed on a surface of the third insulating layer, and a portion of the fourth data lines are disposed in the fifth vias, such that the fourth data lines are electrically connected with the second data lines directly. In some embodiments, a conductive material is filled in the fifth vias, such that the fifth vias are filled with the conductive material, which may ensure a good electrical connection between the second and fourth data lines. In some embodiments, the fourth data lines may be disposed on the surface of the third insulating layer, and the fifth vias are filled with a conductive material, in this way, the fourth data lines are electrically connected with the second data lines through the conductive material filled in the fifth vias. The way for realizing the electrical connection between the second and fourth data lines may be determined upon practical situations, and is not limited in embodiments of the present disclosure.

In some embodiments, the display panel may further include: a plurality of sixth vias disposed in the third insulating layer; and a plurality of fourth connection lines which are disposed in the same layer with the fourth data lines and electrically connected with the plurality of second connection lines through the plurality of sixth vias. In the display panel, the resistance of each of the connection lines which connect the data line driving circuit with the data lines may be decreased.

In some embodiments, a portion of the fourth connection lines are disposed on the surface of the third insulating layer, and a portion of the fourth connection lines are disposed in the sixth vias, such that the fourth connection lines are electrically connected with the second connection lines directly. In some embodiments, a conductive material is filled in the sixth vias, such that the sixth vias are filled with the conductive material, which may ensure a good electrical connection between the second and fourth connection lines. In some embodiments, the fourth connection lines may be disposed on the surface of the third insulating layer, and the sixth vias are filled with a conductive material, in this way, the fourth connection lines are electrically connected with the second connection lines through the conductive material filled in the sixth vias. The way for realizing the electrical connection between the second and fourth connection lines may be determined upon practical situations, and is not limited in embodiments of the present disclosure.

In some embodiments, the display panel may be a liquid crystal display (LCD) panel. The display panel may further include: a plurality of display units defined by the plurality of gate lines and the plurality of first data lines; and a second substrate disposed opposite to the first substrate, wherein each of the plurality of display units includes a pixel electrode layer, a color filter layer disposed opposite to the pixel electrode layer, and a liquid crystal layer disposed between the pixel electrode layer and the color filter layer.

In some embodiments, the display panel further includes: a fourth insulating layer disposed on a surface opposite to the second substrate of the second data line electrode layer; a plurality of seventh vias in the fourth insulating layer, which expose a portion of the second data lines; and a fifth data line electrode layer disposed on a surface opposite to the second substrate of the fourth insulating layer, wherein the fifth data line electrode layer includes a plurality of fifth data lines corresponding to the first data lines and the second data lines. The plurality of fifth data lines are electrically connected with the second data lines through the plurality of seventh vias and further electrically connected with the first data lines through the first vias, which may further reduce the resistance of the data lines in the display panel.

Figure 14:
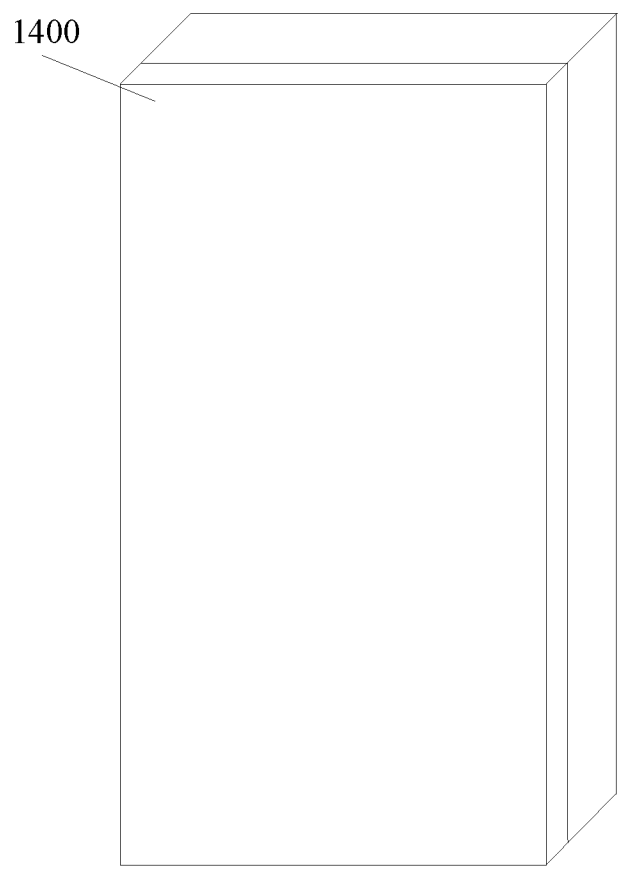
FIG. 14 schematically illustrates a structural diagram of a displaying device according to an embodiment of the present disclosure.

Accordingly, referring to FIG. 14, in an embodiment of the present disclosure, a displaying device is provided, which includes a display panel 1400 provided in any one of the above embodiments.

In the display panel and the displaying device provided in the embodiments of the present disclosure, except for the first data line electrode layer disposed on the first substrate, the display panel further includes the first insulating layer disposed on the first data line electrode layer and the second data line electrode layer disposed on the first insulating layer. The first data line electrode layer includes the plurality of first data lines, and the second data line electrode layer includes the plurality of second data lines respectively corresponding to the first data lines. The plurality of vias are formed in the first insulating layer and expose a portion of the first data lines. In this way, the second data lines are electrically connected with the first data lines through the plurality of vias, which may decrease the resistance of each data line in the display panel, reduce the attenuation of a driving signal transmitted in the data lines which are relatively far away from a driving circuit, and improve a displaying effect of the display panel.

In each portion of above descriptions of embodiments, the description is progressive. Emphasized description in each portion is different from that in other portions, and the same or similar description among the portions may be referred to each other.

The above description of the embodiments can help those skilled in the art to implement or apply the present disclosure. Although the present disclosure has been disclosed as above with reference to preferred embodiments thereof but will not be limited thereto. Those skilled in the art can modify and vary the embodiments without departing from the spirit and scope of the present disclosure. Accordingly, without departing from the scope of the present disclosure, whatever simple modification and equivalent variation belong to the protection range of the present disclosure.

What is claimed is:
1. A display panel comprising:
a display region;
a non-display region disposed around the display region;
a first substrate;
a plurality of gate lines disposed on the first substrate;
a first data line electrode layer disposed on the first substrate, wherein the first data line electrode layer comprises a plurality of first data lines which intersect with and are insulated from the plurality of gate lines;
a first insulating layer disposed on the first data line electrode layer, wherein a plurality of first vias are disposed in the first insulating layer and expose a portion of the first data line electrode layer;

a second data line electrode layer disposed on the first insulating layer, wherein the second data line electrode layer comprises a plurality of second data lines which respectively correspond to the plurality of first data lines and are electrically connected with the plurality of first data lines through the plurality of first vias;

a data line driving circuit disposed in the non-display region;

a plurality of first connection lines connecting the data line driving circuit with the plurality of first data lines;

a plurality of second vias disposed in the first insulating layer, wherein the plurality of second vias expose a portion of the plurality of first connection lines; and a plurality of second connection lines disposed in the same layer with the plurality of second data lines and electrically connected with the plurality of first connection lines through the plurality of second vias.

2. The display panel according to claim 1, wherein along a direction from the first data line electrode layer to the second data line electrode layer, each of the plurality of second data lines is disposed above one corresponding first data line respectively.

3. The display panel according to claim 2, wherein a line width of the second data lines is less than that of the first data lines.

4. The display panel according to claim 1, wherein a conductive material is disposed in the plurality of first vias.

5. The display panel according to claim 1, wherein a conductive material is filled in the plurality of first vias, and a conductive material is filled in the plurality of second vias.

6. The display panel according to claim 1, further comprising:
a plurality of display units defined by the plurality of gate lines and the plurality of first data lines; and
a second substrate disposed opposite to the first substrate, wherein each of the plurality of display units comprises a positive metal layer, over a negative metal layer, and a luminous element disposed between the positive metal layer and the negative metal layer.

7. The display panel according to claim 6, wherein the second data line electrode layer and the positive metal layer are disposed in the same layer.

8. The display panel according to claim 6, further comprising:
a second insulating layer disposed between the second data line electrode layer and the positive metal layer;
a plurality of third vias disposed in the second insulating layer, which expose a portion of the plurality of second data lines; and
a third data line electrode layer disposed on a surface opposite to the positive metal layer of the second insulating layer,
wherein the third data line electrode layer comprises a plurality of third data lines corresponding to the first data lines and the second data lines, wherein the plurality of third data lines are electrically connected with the second data lines through the plurality of third vias and further electrically connected with the first data lines through the plurality of first vias.

9. The display panel according to claim 8, wherein the third data line electrode layer and the positive metal layer are disposed in the same layer.

10. The display panel according to claim 9, wherein along a direction from the second data line electrode layer to the third data line electrode layer, each of the plurality of third data lines is disposed above one corresponding second data line respectively.

11. The display panel according to claim 8, wherein line width of the third data lines is less than that of the second data lines.

12. The display panel according to claim 8, further comprising:
a plurality of fourth vias in the second insulating layer, wherein the plurality of fourth vias expose a portion of the second connection lines; and
a plurality of third connection lines which are disposed in the same layer with the third data lines and electrically connected with the plurality of second connection lines through the plurality of fourth vias.

13. The display panel according to claim 6, further comprising:
a third insulating layer disposed between the negative metal layer and the second substrate;
a plurality of fifth vias in the third insulating layer, which expose a portion of the second data lines;
a fourth data line electrode layer disposed on a surface opposite to the second substrate of the third insulating layer, wherein the fourth data line electrode layer comprises a plurality of fourth data lines corresponding to the first data lines and the second data lines, wherein the plurality of fourth data lines are electrically connected with the second data lines through the plurality of fifth vias and further electrically connected with the first data lines through the first vias.

14. The display panel according to claim 13, wherein the second data line electrode layer and the positive metal layer are disposed in the same layer, and/or the fourth data line electrode layer and the negative metal layer are disposed in the same layer.

15. The display panel according to claim 13, wherein line width of the fourth data lines is less than that of the second data lines.

16. The display panel according to claim 13, further comprising:
a plurality of sixth vias disposed in the third insulating layer; and
a plurality of fourth connection lines which are disposed in the same layer with the fourth data lines and electrically connected with the plurality of second connection lines through the plurality of sixth vias.

17. The display panel according to claim 1, further comprising:
a plurality of display units defined by the plurality of gate lines and the plurality of first data lines; and
a second substrate disposed opposite to the first substrate, wherein each of the plurality of display units comprises a pixel electrode layer, a color filter layer disposed opposite to the pixel electrode layer, and a liquid crystal layer disposed between the pixel electrode layer and the color filter layer.

18. The display panel according to claim 17, further comprising:
a fourth insulating layer disposed on a surface opposite to the second substrate of the second data line electrode layer;
a plurality of seventh vias disposed in the fourth insulating layer, which expose a portion of the second data lines; and
a fifth data line electrode layer disposed on a surface opposite to the second substrate of the fourth insulating layer, wherein the fifth data line electrode layer comprises a plurality of fifth data lines corresponding to the first data lines and the second data lines, wherein the plurality of fifth data lines are electrically connected with the second data lines through the plurality of seventh vias and further electrically connected with the first data lines through the first vias.

19. A displaying device, comprising a display panel, the display panel comprising:
a display region;
a non-display region disposed around the display region,
a first substrate;
a plurality of gate lines disposed on the first substrate;
a first data line electrode layer disposed on the first substrate, wherein the first data line electrode layer comprises a plurality of first data lines which intersect with and are insulated from the plurality of gate lines;
a first insulating layer disposed on the first data line electrode layer, wherein a plurality of first vias are formed in the first insulating layer and expose a portion of the first data lines;
a second data line electrode layer disposed on the first insulating layer,
wherein the second data line electrode layer comprises a plurality of second data lines which respectively correspond to the plurality of first data lines and are electrically connected with the plurality of first data lines through the plurality of first vias;
a data line driving circuit disposed in the non-display region;
a plurality of first connection lines connecting the data line driving circuit with the plurality of first data lines;
a plurality of second vias disposed in the first insulating layer, wherein the plurality of second vias exposes a portion of the plurality of first connection lines; and
a plurality of second connection lines disposed in the same layer with the plurality of second data lines and electrically connected with the plurality of first connection lines through the plurality of second vias.

* * * * *